Patented May 31, 1938

2,119,171

UNITED STATES PATENT OFFICE 2,119,171

METHOD FOR THE PREPARATION OF ARALKYL ETHERS OF CELLULOSE

Eugene J. Lorand, Wilmington, Del., assignor to Hercules Powder Company, Wilmington, Del., a corporation of Delaware No Drawing. Application July 30, 1934, Serial No. 737,577

10 Claims. (Cl. 260—152)

This invention relates to a method for the preparation of aralkyl ethers of cellulose and more particularly to a method for the preparation of benzyl cellulose.

Aralkyl ethers of cellulose are ordinarily produced by the reaction of an aralkyl halide on a mixture of cellulose and aqueous alkali solution, usually referred to as alkali cellulose. Many methods for effecting the reaction are known, but substantially all involve heating the reactants together, usually at a temperature of from about 60° C. to about 130° C. Occasionally all the alkali required during the reaction is added at the start thereof, but usually only a portion of the alkali required is added then and the remainder is added periodically during the reaction. When the reaction is carried out at the higher temperature ranges it is customary to permit distillation of water and aralkyl halide from the reaction mass, the aralkyl halide being returned to the reaction.

In order to increase the efficiency of contact between the phases aralkyl halide and aqueous alkali, and hence the speed and completeness of the etherification reaction, it has previously been proposed to emulsify these two phases, one in the other; and certain emulsifying agents, such as organic sulphonic acids and their alkali salts, have been suggested as suitable for use in that connection. However, these emulsifying agents not being soluble in aralkyl halides, must be brought into the reaction mass in the aqueous phase. Difficulty arises here because the emulsifying agents are not soluble in the cold, concentrated alkali solutions used in preparing the alkali cellulose. Hence, it is necessary to perform additional operations prior to the formation of alkali cellulose to introduce these emulsifying agents, a procedure wasteful of both time, labor and material.

In accordance with this invention, it has been found that emulsifying agents soluble in aralkyl halides may be used with advantage in the preparation of aralkyl ethers of cellulose, and that such emulsifiers may be introduced without difficulty or additional operations into the reaction mass along with the aralkyl halide. Any emulsifying agent soluble in the particular aralkyl halide used may be employed, such as, for example, oleic acid, coconut oil acids, abietic acid (rosin), etc.

The method in accordance with this invention contemplates the preparation of alkali cellulose from any suitable cellulosic material, such as, for example, purified cotton linters, and an alkali, as sodium hydroxide. Desirably an aqueous alkali solution of from about 18% to about 33% concentration will be used in preparing the alkali cellulose, and the cellulose, after immersion for from 1 to 6 hours, will be pressed until it contains about 160–300% of its weight of alkali solution. The alkali cellulose so formed will then be treated with an aralkyl halide, usually in an amount of from 3 to 12 times by weight that of the cellulose used. The aralkyl halide may be added in one portion at the start of the reaction, or in several portions, the first, constituting 60–80% of the total amount, at the start of the reaction, and the remaining portions during the reaction. The emulsifying agent is added, dissolved in the aralkyl halide, or in the first portion thereof, in an amount of from about 1% to about 20%, preferably from about 3% to about 8% of the weight of aralkyl halide used.

The reactants are then raised to reaction temperature, 60°–130° C., and the reaction allowed to proceed. Desirably the reaction temperature is kept rather low, 60°–100° C., during the initial stages of the reaction, and is later increased after a uniform "dope" has formed. During the later stages of the reaction, distillation of water from the reaction mass may be effected, and additional amounts of alkali may be used. It is preferable to subject the reaction mass to gentle agitation during the initial stages of reaction, and later to impart vigorous agitation, as disclosed in my copending application Serial No. 737,576, filed July 30, 1934. In general, the conditions of the etherification procedure in accordance with any of the usual processes are well known to the art, and need not be particularized here. The reaction is considered complete when all of the cellulose fibres in the reaction mass have been completely dispersed. The aralkyl ether of cellulose is then recovered from the reaction mass by any of the known methods, as precipitation, etc. It will be found that the presence of an emulsifying agent in accordance with this invention greatly facilitates the ease of recovery of the aralkyl ether by precipitation.

The following example is illustrative of procedure in accordance with this invention:

250 g. purified cotton linters are immersed in 4 liters of 33% caustic soda solution and, after 3–4 hours, pressed out, so that the weight of the resulting alkali cellulose is 1000–1100 g. After shredding in a suitable device, as customary in rayon manufacture, the fluffy, fibrous alkali cellulose is placed in a steam-jacketed Werner and Pfleiderer mixer. 90 g. of a mixture consisting of the acids of coconut oil are dissolved in 2000 cc. of benzyl chloride and the solution is added to the alkali cellulose. The mixture is then heated with slow agitation at 90° C. for 15–18 hours. The resulting soft, uniform, doughy mass is then transferred to apparatus equipped for vigorous agitation and with a condenser for distillation. 100 g. of solid caustic soda are added and the mixture is gradually heated to distillation temperature (about 115–125° C.) with increasing agitation, when a mixture of water and benzyl chloride distils over. In about 1–2 hours, practically all the water has been thus removed from the reaction mixture, and the benzylation may be considered finished. The benzyl cellulose formed is precipitated by the addition of 6 liters gasoline, and the precipitate is washed several times with gasoline, alcohol and water. It may also be extracted with methanol for further purification.

It will be understood that the method in accordance with this invention comprises effecting according to any of the well known procedures the reaction between alkali cellulose and an aralkyl halide in the presence of an emulsifying agent soluble in the aralkyl halide. It will be further understood that the invention is not limited in any way to the details and examples set forth hereinabove by way of illustration only.

Having now fully described my invention, what I claim and desire to protect by Letters Patent is:

1. The method for the preparation of aralkyl ethers of cellulose which includes treating at reaction temperature alkali cellulose with an aralkyl halide in the presence of an emulsifying agent soluble in the aralkyl halide.

2. The method for the preparation of aralkyl ethers of cellulose which includes treating at reaction temperature alkali cellulose with an aralkyl halide containing an emulsifying agent dissolved therein.

3. The method for the preparation of aralkyl ethers of cellulose which includes treating at reaction temperature alkali cellulose with an aralkyl halide containing oleic acid dissolved therein.

4. The method for the preparation of aralkyl ethers of cellulose which includes treating at reaction temperature alkali cellulose with an aralkyl halide containing a coconut oil acid dissolved therein.

5. The method for the preparation of aralkyl ethers of cellulose which includes treating at reaction temperature alkali cellulose with an aralkyl halide containing abietic acid dissolved therein.

6. The method for the preparation of benzyl cellulose which includes treating at reaction temperature alkali cellulose with benzyl chloride in the presence of an emulsifying agent soluble in the benzyl chloride.

7. The method for the preparation of benzyl cellulose which includes treating at reaction temperature alkali cellulose with benzyl chloride containing an emulsifying agent dissolved therein.

8. The method for the preparation of benzyl cellulose which includes treating at reaction temperature alkali cellulose with benzyl chloride containing oleic acid dissolved therein.

9. The method for the preparation of benzyl cellulose which includes treating at reaction temperature alkali cellulose with benzyl chloride containing a coconut oil acid dissolved therein.

10. The method for the preparation of benzyl cellulose which includes treating at reaction temperature alkali cellulose with benzyl chloride containing abietic acid dissolved therein.

EUGENE J. LORAND.